United States Patent
Plona

(10) Patent No.: US 7,086,649 B2
(45) Date of Patent: Aug. 8, 2006

(54) GASKET WITH TWO CONCENTRIC LIPS

(75) Inventor: Daniel Georges Plona, Vulaines sur Seine (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 10/488,930

(22) PCT Filed: Oct. 24, 2002

(86) PCT No.: PCT/FR02/03643

§ 371 (c)(1),
(2), (4) Date: Mar. 15, 2004

(87) PCT Pub. No.: WO03/036140

PCT Pub. Date: May 1, 2003

(65) Prior Publication Data

US 2004/0239039 A1 Dec. 2, 2004

(30) Foreign Application Priority Data

Oct. 25, 2001 (FR) .................................. 01 13781

(51) Int. Cl.
*F16J 15/34* (2006.01)
*F16J 15/447* (2006.01)

(52) U.S. Cl. ............... 277/413; 277/418; 277/424; 277/399; 415/174.2

(58) Field of Classification Search ............... 277/411, 277/412, 413, 418, 423, 424, 399, 400, 401; 415/113, 174.2, 174.5

See application file for complete search history.

(56) References Cited

U.S. PATENT DOCUMENTS

| 2,598,176 | A |   | 5/1952 | Johnstone |
| 3,383,033 | A |   | 5/1968 | Moore |
| 3,532,399 | A | * | 10/1970 | Gray ........................ 277/347 |
| 3,731,940 | A | * | 5/1973 | Spruiell ..................... 277/424 |
| 4,375,891 | A | * | 3/1983 | Pask .......................... 415/115 |
| 4,817,966 | A | * | 4/1989 | Borowski ................... 277/424 |
| 5,207,560 | A | * | 5/1993 | Urban ..................... 415/199.1 |
| 5,577,887 | A | * | 11/1996 | Gouyon et al. .......... 415/174.2 |
| 5,609,342 | A | * | 3/1997 | Peterson et al. ........... 277/399 |
| 5,743,707 | A | * | 4/1998 | Battig et al. ............... 415/113 |
| 5,769,604 | A | * | 6/1998 | Gardner et al. .......... 415/170.1 |
| 6,299,173 | B1 | * | 10/2001 | Lai ............................ 277/348 |
| 6,578,849 | B1 | * | 6/2003 | Haje .......................... 277/389 |
| 2001/0006278 | A1 |   | 7/2001 | Haje |

FOREIGN PATENT DOCUMENTS

FR 2 785 355 5/2000

\* cited by examiner

*Primary Examiner*—Alison K. Pickard
(74) *Attorney, Agent, or Firm*—Oblon, Spivak, McClelland, Maier & Neustadt, P.C.

(57) ABSTRACT

A gasket, sliding about the axis of rotation of a part to be brought closer to or to be spaced apart from another part with which it provides tightness through a pair of lips provided on a ring. The gasket includes a portion of the ring capable of bending to modify the clearance between the corresponding lip and the part, the pressure prevailing in an intermediate cavity, the balance of forces on the joint and hence the clearance and the leak flow rate allowed before the gasket, which is advantageous in particular in a case of ventilation gas for refrigerating an element of the machine in controlled operating conditions.

20 Claims, 2 Drawing Sheets

GASKET WITH TWO CONCENTRIC LIPS

The purpose of this invention is a gasket placed between two mutually rotating parts, and more precisely of the sliding type on one of the parts along the rotation axis and comprising two concentric lips directed towards a plane face of the other of the parts.

This type of gasket creates a variable leak tightness between two chambers delimited by two parts depending on the clearance between the lips and the plane face, and can be in different equilibrium states determined by the forces of the different pressures applied to the surface. The lips play the important role of delimiting a cavity in which there is an intermediate pressure between the pressures in the two chambers separated by the gasket. This intermediate pressure depends on the clearance between the lips and the plane face of the part facing it; for example, if this clearance increases, leaks through the gasket become greater and the pressure in the cavity tends to approach the lowest pressure. The pressure balance is broken since the pressure forces acting in the cavity and pushing the gasket from the plane face are lowered, while the other pressure forces remain the same. Therefore, the gasket is pushed towards the plane face until the clearance returns to its equilibrium value. Therefore there will not be any friction between a well-designed gasket of this type and the plane face, and it will only allow very small flows of gas through it.

However, the stability of the equilibrium may still become a disadvantage in some circumstances, particularly when the gas in the high-pressure chamber is a ventilation gas for which the leak flow towards another chamber must be increased so as to add further cooling to it.

Consequently, the purpose of this invention is an improvement to the gasket described above so that its clearance and its leak flow can be varied deliberately and under control. The means selected consists of allowing deformation of one of the portions of the gasket supporting one of the lips, to move away from or towards the plane part and to facilitate or oppose communication of the cavity towards the chamber behind this mobile lip. The pressure in the cavity, and the pressure equilibrium that is found for another position of the gasket requiring a clearance and a different leak flow, are modified accordingly.

There are deformable gaskets under the pressure of the surrounding gas, but they are used in different situations and particularly do not provide any information about how to change the pressure in a cavity intermediate between the chambers. Examples are given in European patent 0 629 798 and French patent 2 765 653.

The nature of the forces causing deformation of the ring may be different, as will be seen later.

Thus, the invention relates to a gasket placed between a first part provided with a pair of circular and plane facets (or sealing areas), and a second part rotating with respect to the first part in front of the facets about an axis, the gasket comprising a cylindrical sleeve sliding on the second part in the axis, a ring fixed to the sleeve and two circular lips projecting from the ring towards the facets, characterized in that the ring comprises a portion that is flexible under the effect of surrounding forces, between the sleeve and one of the lips.

The invention will now be described with reference to the figures.

Figure 1:
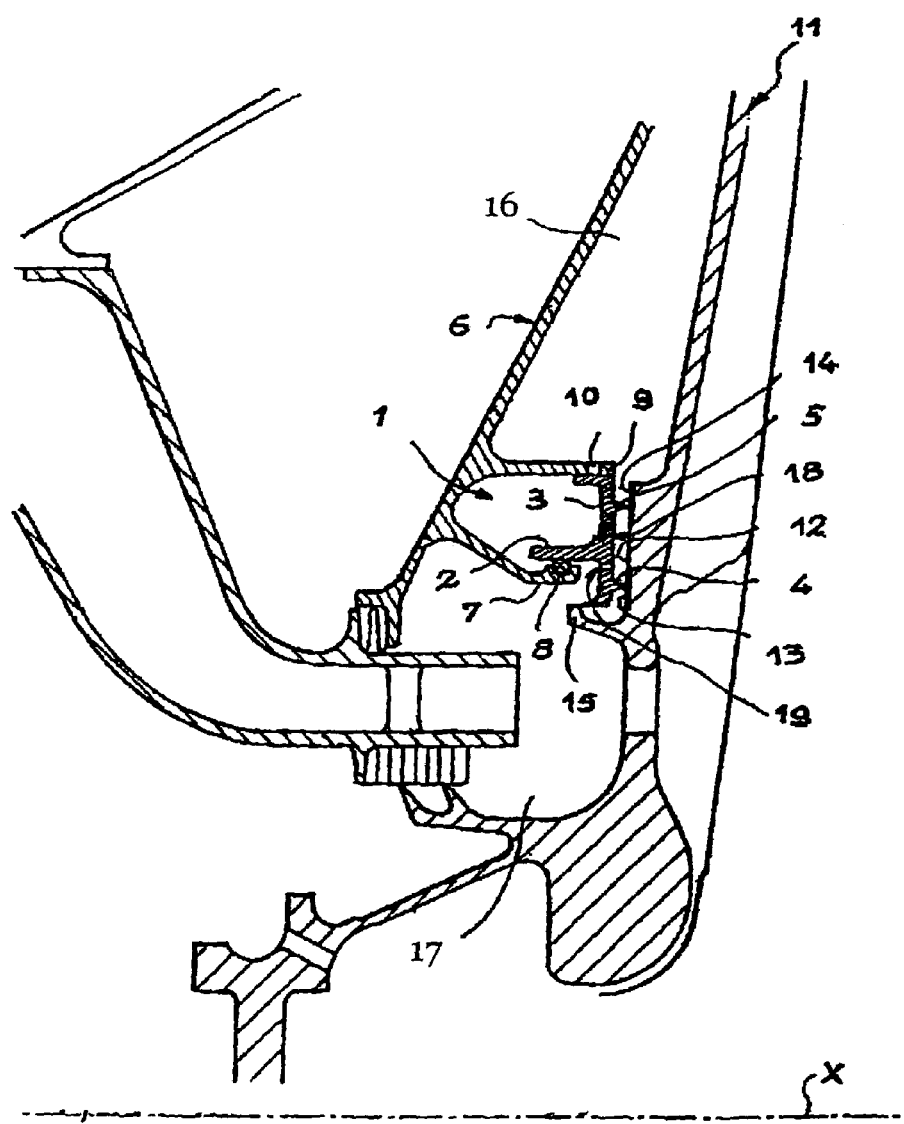
FIG. 1 shows a general view of the gasket conform with the invention.

The gasket is marked as general reference 1 and is composed of a cylinder sleeve 2, a circular ring 3 adjacent to the sleeve 2 and two sealing lips 4 and 5 projecting from the ring 3 on its face opposite the sleeve 2; it is connected in rotation to a part 6, that includes a sleeve 7 in which the sleeve of the gasket 1 can slide through a packing 8 that creates a secondary leak tightness. The gasket 1 also includes a rotation stop pin 9 that is retained in a groove 10 of the part 6 in order to keep them together against rotation movements, and it may be continuous or composed of adjacent arc sectors, as is known in standard practice.

A second part 11 supports a plane face 12 comprising a pair of polished or mat bearing surfaces, 13 and 14 respectively, in front of the lips 4 and 5; there is also a hook 15 that extends beyond the ring 3 and caps its outer periphery, to prevent excessive withdrawal movements of the gasket 1, which are always possible in transient operating phases of the machine on which it is fitted. Parts 6 and 11 rotate with respect to each other about an axis X.

A high pressure chamber 16 is included between parts 6 and 11 and the lip 5, and a low pressure chamber 17 between the same parts 6 and 11 and the other lip 4; finally, a cavity 18 is delimited by the ring 3, the lips 4 and 5 and the plane face 12 of the part 11.

A leakage current is maintained from the chamber 16 to the chamber 17 through the clearance between the lips 4 and 5 and the bearing surfaces 13 and 14; an intermediate pressure appears in the cavity 18 and its value may be modified by drillings 19 through the ring 3 to set up an additional link with one or other of the chambers, in this case the high pressure chamber 16.

Figure 2:
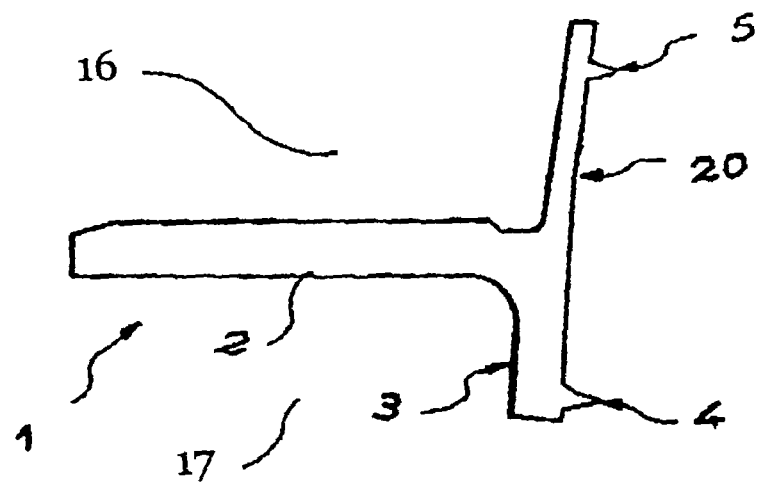
FIGS. 2 and 3 illustrate two variant embodiments.

As shown in FIG. 2, the ring 3 is thinned on the side of the high pressure chamber 16 and the lip 5, so as to create a flexible portion 20. By adjusting the high pressure in the chamber 16 so as to increase it, the part 20 bends towards the plane face 12 and reduces communication with the high pressure chamber 16, and therefore the leak flow. Conversely, a reduction in the high pressure in the chamber 16 increases this flow.

Figure 3:
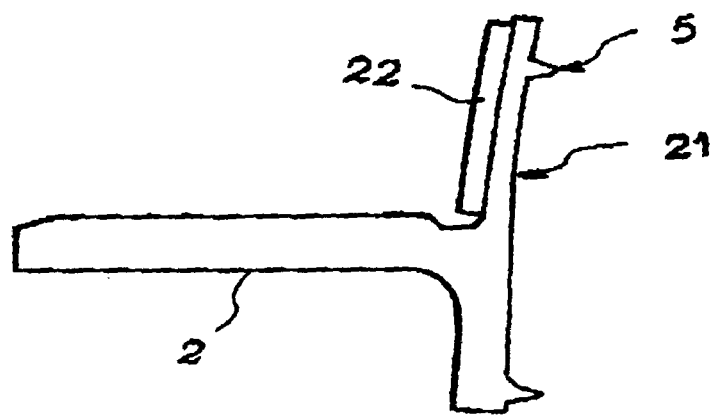

FIG. 3 shows an equivalent design, however in this case it is not a pressure adjustment that controls deformation of the leak flow, but a change to the temperature; the flexible part, in this case reference 21, of the ring 3 (as before located between the sleeve 2 and the lip 5) is completed by a layer 22 of heterogeneous material that creates a bimetallic structure, and therefore that has the property of bending due to differences in the coefficients of expansion. The same effect could be obtained with a shape memory material worked to have two different bending states; this material may be added onto the surface of the gasket 1, like layer 22, bonded to gasket 1; or the gasket 1 may itself be made from this material.

It is generally advantageous if the sleeve 2 is connected to the ring 3 at a location at which the radius is not equal to average radius of the ring and dividing it into two portions with unequal widths, and the flexible portion corresponds to the widest measured part starting from the sleeve 2.

The invention claimed is:

1. A gasket configured to be arranged between a first part provided with a pair of circular and plane facets and a second part configured to rotate with respect to the first part and in front of the facets about an axis, the gasket comprising:

a cylindrical sleeve configured to slide on the second part along the axis;

a ring fixed to the sleeve and two circular lips projecting from the ring towards the facets, wherein the ring comprises a portion that is flexible under effect of surrounding forces, between the sleeve and one of the lips, and the sleeve is attached to the ring away from a mean radius of the ring, the sleeve dividing the ring into two portions of unequal width, the flexible portion included in a first portion having a greater width than a second portion.

2. The gasket according to claim 1, wherein the flexible portion corresponds to a thinning of the ring.

3. The gasket according to claim 1, wherein the flexible portion comprises a heterogeneous part with a portion complementary to the ring.

4. The gasket according to claim 3, wherein the heterogeneous part is made from a shape memory alloy.

5. The gasket according to claim 3, wherein the flexible portion is bimetallic.

6. The gasket according to claim 1, wherein the gasket is made from a shape memory alloy.

7. The gasket according to claim 1, wherein drillings pass through the ring.

8. The gasket according to claim 7, wherein drillings pass through the first portion of the ring.

9. A gasket configured to be arranged between a first part provided with a pair of circular and plane facets and a second part configured to rotate with respect to the first part and in front of the facets about an axis, the gasket comprising:

cylindrical sleeve means for sliding on the second part along the axis;

a ring fixed to the sleeve means and two circular lips projecting from the ring towards the facets, wherein the ring comprises means for flexing under effect of surrounding forces, between the sleeve means and one of the lips, and the sleeve means is attached to the ring away from a mean radius of the ring, the sleeve means dividing the ring into two portions of unequal width, the means for flexing included in a first portion having a greater width than a second portion.

10. The gasket according to claim 9, wherein the means for flexing is a thinning of the ring.

11. The gasket according to claim 9, wherein the means for flexing is a heterogeneous part with a portion complementary to the ring.

12. The gasket according to claim 11, wherein the heterogeneous part is made from a shape memory alloy.

13. The gasket according to claim 11, wherein the means for flexing is bimetallic.

14. The gasket according to claim 9, wherein the gasket is made from a shape memory alloy.

15. The gasket according to claim 9, wherein drillings pass through the ring.

16. The gasket according to claim 15, wherein drillings pass through the first portion of the ring.

17. A gasket configured to be arranged between a first part provided with a pair of circular and plane facets and a second part configured to rotate with respect to the first part and in front of the facets about an axis, the gasket comprising:

a cylindrical sleeve configured to slide on the second part along the axis;

a ring fixed to the sleeve and two circular lips projecting from the ring towards the facets, wherein the ring comprises a portion that is flexible under effect of surrounding forces, between the sleeve and one of the lips, and the flexible portion comprises a heterogeneous part with a portion complementary to the ring.

18. The gasket according to claim 17, wherein the heterogeneous part is made from a shape memory alloy.

19. The gasket according to claim 17, wherein the flexible portion is bimetallic.

20. The gasket according to claim 17, wherein drillings pass through the ring.

* * * * *